Figure 1:
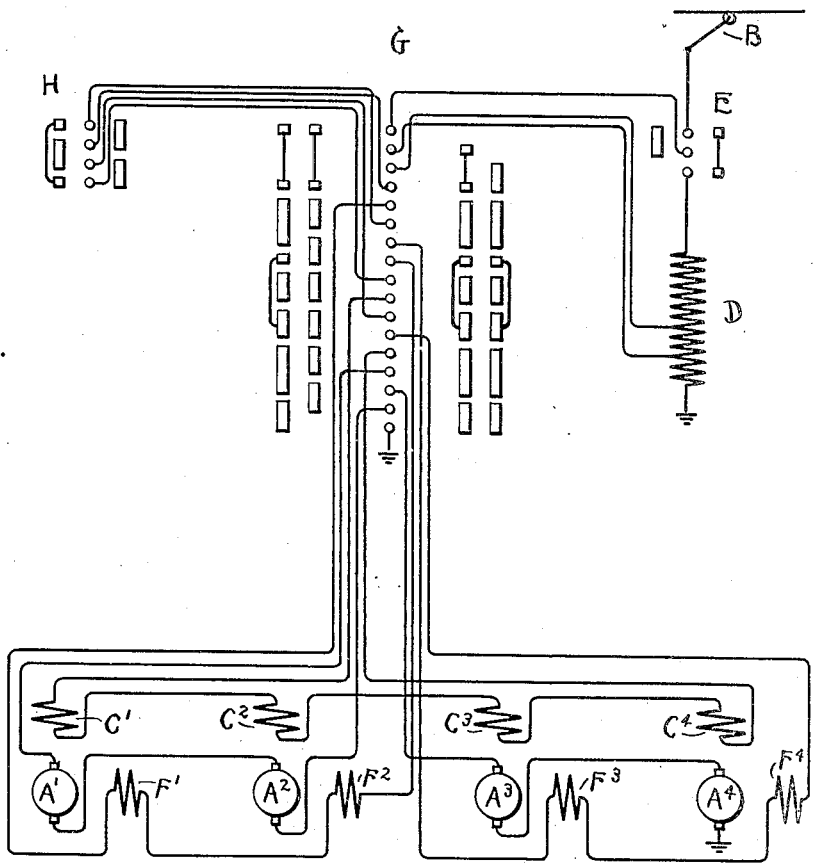

No. 876,924. PATENTED JAN. 21, 1908.
E. F. W. ALEXANDERSON.
COMPENSATED MOTOR.
APPLICATION FILED JULY 19, 1906.

2 SHEETS—SHEET 1.

Witnesses
Benjamin B. Hull
Green Oxford

Inventor
Ernst F.W. Alexanderson.
by Albert G. Davis
Atty.

Witnesses
Murray D. Badgley
Helen Orford

Inventor
Ernst F. W. Alexanderson,
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

COMPENSATED MOTOR.

No. 876,924.

Specification of Letters Patent.

Patented Jan. 21, 1908.

Application filed July 19, 1906. Serial No. 326,861.

*To all whom it may concern:*

Be it known that I, ERNST F. W. ALEXANDERSON, a subject of the King of Sweden, residing at Schenectady, county of Schenectady, State of New York, have invented certain new and useful Improvements in Compensated Motors, of which the following is a specification.

My invention relates to electric motors of the commutator type provided with compensating windings. Such windings, though frequently used on direct-current motors, are particularly advantageous on alternating-current motors of the commutator type, both for the purpose of neutralizing armature self-induction and for improving commutation, which presents more difficulties in alternating-current motors than in direct-current machines, on account of the relatively weaker field which is ordinarily used on alternating-current motors, and because of the alternating-flux threading the short-circuited coil in commutation.

Compensating windings are ordinarily placed in slots at or near the inner face of the field structure. Since alternating-current commutator motors are usually designed for operation on low voltage, the current capacity, and consequently the size, of the compensating winding, which is connected in series with the armature, must be large. If there were sufficient space on the inner periphery of the field structure, the compensating winding could be wound with only a single conductor per slot, which gives a maximum efficiency, so far as material is concerned, since a smaller proportion of the slot-space is then required for insulation. In the smaller sizes of machines, however, there is not room enough on the field structure for the number of slots that would be required for this construction. But when two or more conductors per slot are used, much space is lost in insulation, and also the end-connections of the compensating winding are complicated and hard to make, since the conductors are of considerable size and must be properly insulated from each other.

By my invention it is possible to use only one conductor per slot for the compensating winding, thereby obtaining maximum efficiency of material and the simplest possible end-connections.

My invention consists in arranging the compensating windings of a plurality of motors with a smaller number of turns than the effective turns of the armature, and in arranging a plurality of armatures in parallel with each other and placing the compensating windings in series with each other and with the armatures. Thus, for instance, if two compensated motors are arranged each with half the usual number of turns in their compensating windings, then by connecting the two armature windings in parallel with each other, and the two compensating windings in series, each compensating winding carries twice as much current as the armature, so that the proper proportion of ampere turns is secured.

Figure 2:
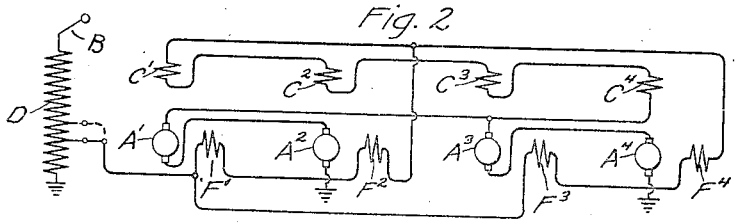
Figure 3:
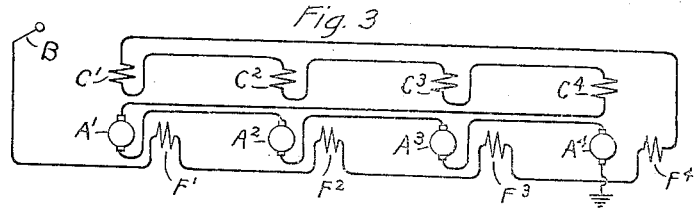
Figure 4:
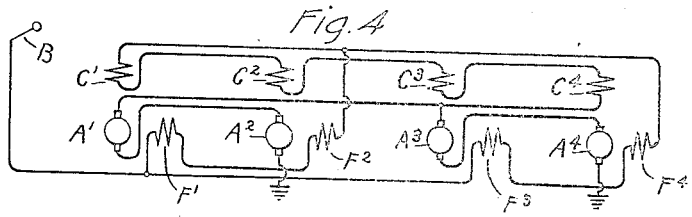

My invention will best be understood by reference to the accompanying drawings, in which Figure 1 shows diagrammatically a plurality of compensated motors arranged to be operated in accordance with my invention; Figs. 2, 3 and 4 show the circuit-connections obtained by means of the controlling switches of Fig. 1; and Fig. 5 shows a motor having a compensated winding arranged with one conductor per slot, in accordance with my invention.

Figure 5:
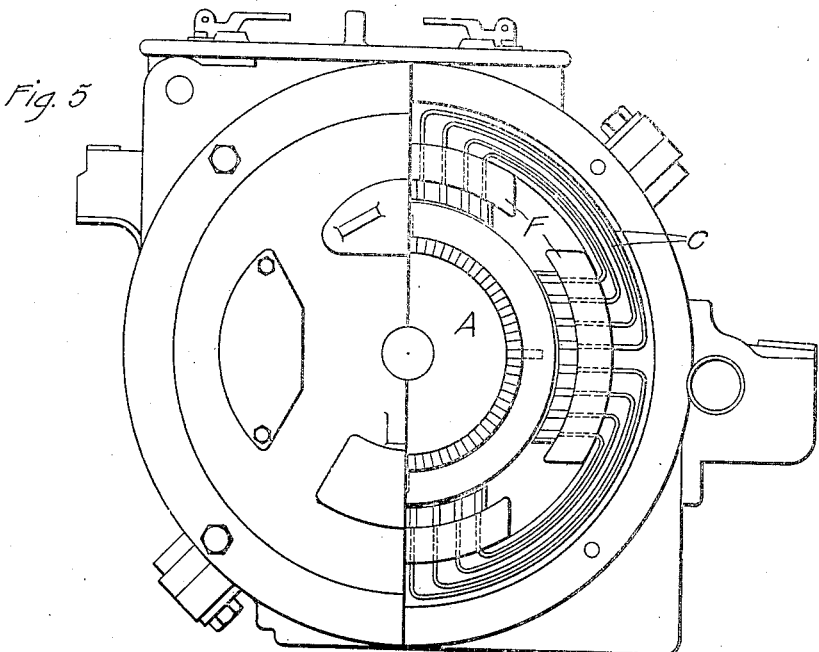

Referring first to Fig. 5, A represents the armature, and F the field coil of an electric motor of the commutator type. C represents the compensating winding, which is carried in slots at the face of the field poles, and which is formed with one conductor per slot.

Now, referring to Fig. 1, I have shown four motors, the armature of the first motor being indicated by $A^1$, the second by $A^2$, etc. These motors may represent the equipment of an electric car or locomotive which it is desired to operate on both direct and alternating-current. B represents the trolley or collector-shoe, which is arranged to be connected through a switch E to the controlling switch G, either directly or through the auto-transformer D. Switch E is the commutating switch, which is thrown in one direction or the other, according as it is desired to operate on alternating or direct-current. For alternating-current operation switch E is thrown toward the left, connecting trolley B to one terminal of the auto-transformer D. For direct-current operation the switch is thrown in the opposite direction, connecting trolley B to the upper contact-finger of controlling switch G. H represents the reversing switch. Controlling switch G is shown with four positions, two for alternating-current operation, and two for direct. In its two alternating-current positions, indicated by the right-hand movable contacts, the switch makes no change in the connections of the motors to each other, but simply varies the point of connection of the motors to the auto-transformer D, as will be evident from an inspection of the figure.

The motor connections for alternating-current operation are shown in Fig. 2. It will be seen that the four motors are connected in series-parallel,—that is two fields are connected in series with each other and in parallel with the other two windings, and the armatures are similarly connected. The compensating windings are, however, all connected in series so that the current flowing through the compensating windings is twice the current in each armature. By means of this connection a compensating winding having only half the usual number of turns may be employed.

For direct-current operation the switch H is arranged to connect the four motors in series and in parallel. The series connection is shown in Fig. 3, in which all four motors have their fields, compensating windings and armatures all connected in series. With this connection, only half compensation is obtained, but for direct-current operation at low speeds, this under-compensation is entirely immaterial. In the second position of the switch the connections shown in Fig. 4 are established, which are identical with those shown in Fig. 2, except that the motor circuit is connected directly to trolley, instead of to the auto-transformer. Thus, for full-speed direct-current operation, full compensation is obtained in precisely the same manner as it is obtained for both speeds in alternating-current operation.

Although I have shown only two positions of the switch G for operation on each kind of current, it will be understood that this switch may be modified as desired.

The parallel connection of the armatures with series connection of the compensating windings possesses an advantage additional to those already pointed out, since if the driving-wheels, to which any one motor is connected, begin to slip so that the motor speeds up, the current of that motor will be cut down by the rise in counter-electromotive force, while the motor in parallel with it will be taking full current, all of which passes through the compensating winding of the first motor, so that slipping motor is automatically over-compensated, which helps to prevent commutation troubles at the high-speed due to the slip.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination, a plurality of motors of the commutator type, each having a compensating winding with a smaller number of turns than the effective turns of the armature, and means for connecting a plurality of motors with their armatures in parallel with each other and their compensating windings in series with each other and with the armatures.

2. A plurality of motors of the commutator type, each having a compensating winding with a smaller number of turns than the effective turns of the armature, said motors being connected with their armatures in parallel with each other and their compensating windings in series with each other and with the armatures.

3. In combination, a plurality of motors of the commutator type, each having a compensating winding with a smaller number of turns than the effective turns of the armature, and a controlling switch for said motors arranged in its full-speed position to connect a plurality of motors with their armatures in parallel with each other and with their compensating windings in series with each other and with the armatures.

4. The method of operating a plurality of motors of the commutator type, each having a compensating winding with a smaller number of turns than the effective turns of the armature, which consists in connecting a plurality of the motors with their armatures in parallel with each other and their compensating windings in series with each other and with the armatures.

In witness whereof, I have hereunto set my hand this 7th day of July, 1906.

ERNST F. W. ALEXANDERSON.

Witnesses:
 BENJAMIN B. HULL,
 HELEN ORFORD.